C. E. SHORT.
NUT LOCK.
APPLICATION FILED DEC. 10, 1915. RENEWED NOV. 14, 1917.

1,253,638.    Patented Jan. 15, 1918.

WITNESSES
Edw. S. Hall
Lloyd W. Patch

INVENTOR
Charles E. Short.
BY Richard Owen
ATTORNEY

UNITED STATES PATENT OFFICE.

CHARLES E. SHORT, OF AKRON, OHIO.

NUT-LOCK.

1,253,638. Specification of Letters Patent. Patented Jan. 15, 1918.

Application filed December 10, 1915, Serial No. 66,128. Renewed November 14, 1917. Serial No. 202,070.

*To all whom it may concern:*

Be it known that I, CHARLES E. SHORT, a citizen of the United States, residing at Akron, in the county of Summit and State of Ohio, have invented certain new and useful Improvements in Nut-Locks, of which the following is a specification.

An object of my invention is to provide a lock nut, with the use of which the nut and bolt are coupled against rotation with respect to each other and the nut is held against back movement by the tightening of the same against the parts to be secured.

A further object is to so construct the parts that when the nut is tightened into place, the entire securing portion thereof is closed to view and to access by anyone endeavoring to tamper with the fastening as well as protected from the elements.

With these and other objects in view, which will be referred to my invention consists in certain novel features of construction and combination of parts which will be hereinafter set forth in connection with the accompanying drawings and more particularly pointed out in the appended claims.

Figure 1:
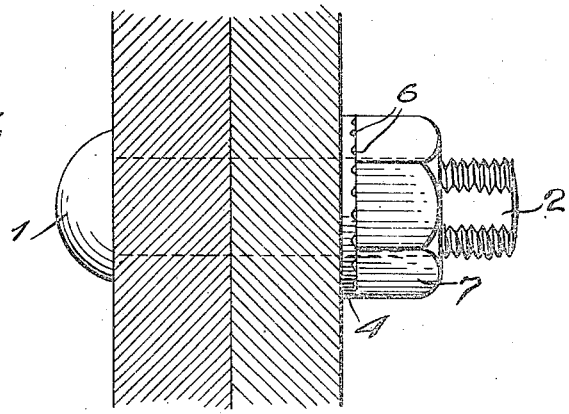
Figure 1 is a view in section through two members secured by a bolt and nut embodying my invention.
Figure 2:
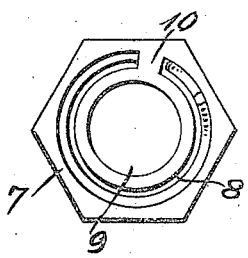
Fig. 2 is a bottom plan view of the nut.
Figure 3:
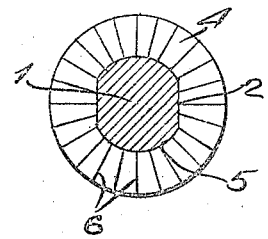
Fig. 3 is a sectional view taken transversely through the bolt at a point adjacent the face of the washer.
Figure 6:
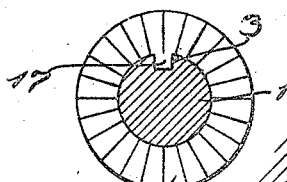
Fig. 6 is a view similar to Fig. 3 of a slightly modified form of the construction.
Figure 4:
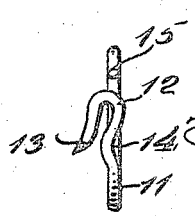
Fig. 4 is a view in side elevation of the biting tooth securing member.
Figure 5:
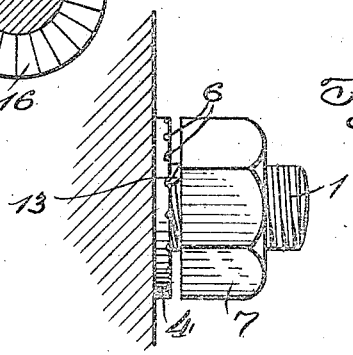
Fig. 5 is a view similar to Fig. 1 but with the nut only partly tightened onto the bolt.

The bolt 1 may be of standard form and of any design in so far as the head and the main body portion are concerned, the chief difference being that the sides of the threaded portion are cut away as at 2, or this portion has the key slot 3 formed longitudinally thereof, as is illustrated in the modified construction disclosed in Fig. 6.

A washer 4 has the central orifice 5 made of a form to fit the threaded end of the bolt 1 and to also follow the contour of the cut away or flat side thereof, and this washer has the ratchet notches 6 formed radially on one face thereof to make a rosette form.

The nut 7 is provided with an interrupted annular groove 8 on the inner face thereof, which groove follows the contour of the screw threaded central orifice 9 of the nut, the interruption in this groove 8, as indicated at 10, being positioned to act as a stop. A spring locking member 11 is made in the form of a split ring of a diameter to be received in the groove 8 and the one end is turned over in a hooked formation at 12 and has a biting tooth 13 formed on the extreme end thereof. A hump 14, which, in use, acts to give additional spring action to the biting tooth 13 is formed in the body of the member 11, and the remaining end of this member is cut across to be received against the interrupted portion 10 of the groove 8 as the locking member 11 is fitted in this groove.

In the use of the device, the spring latch member 11 is fitted in the groove 8 with the biting tooth 13 thereof projecting beyond the inner face of the nut, the washer 4 is placed on the bolt with the toothed face thereof disposed outwardly and then by screwing the nut onto the threaded portion of the bolt, the biting tooth 13 is brought against this toothed face of the washer and as the tooth 13 bites into the notches 6, the nut is held against return movement. The free end 15 of the locking member 11 has bearing against the stop portion 10 of the nut and thus this locking member is held against movement around the annular groove 8.

In the modified form of the construction, as illustrated in Fig. 6, the bolt 1 has the keyway 3 formed longitudinally thereof in the threaded portion and the washer 16 has a key portion 17 disposed through a stem into the central orifice thereof to be received and slide in the keyway 3 as the washer is placed over the end of the bolt 1 and to hold this washer against turning of the bolt.

From the foregoing it will be seen that I have provided a nut lock in which the biting tooth carried by the nut to operate with the toothed washer to secure the nut against turning movement with respect to the bolt as the parts are tightened into the operative relation, additional resiliency and spring being given to the biting tooth by the formation of the locking ring 11 with the tooth disposed therefrom in a hooked relation and joined in the body portion by the spring hump 14, and further that when the parts are assembled in the operative relation the biting tooth is entirely protected against anyone endeavoring to remove the nut and against the corrosive and destructive effect of the elements.

While I have shown and described substantially only one form of the structure, it will be understood that the design of the washer as well as the nut and bolt form might be modified and that other changes could be resorted to without departing from the spirit and scope of my invention, and hence I do not wish to be limited except for such points as may be covered by the claims.

I claim:

1. A nut lock comprising in combination with a bolt, a washer mounted on the bolt to be held against turning movement and provided with teeth on one face, a nut having an interrupted annular groove formed in the engaging face thereof, and a spring member looped over at one end to provide a biting tooth mounted in said groove to be held against movement therein by the interrupted portion as a stop and arranged to engage with the teeth of the washer as the nut is tightened thereagainst.

2. A nut lock comprising in combination with a bolt having a flat side on the threaded end thereof, a washer mounted on the end of the bolt to be held against turning movement by engagement with the flat side of the bolt provided with radially extending teeth formed on one face thereof, a nut having an interrupted annular groove formed in the engaging face to follow the line of the central orifice thereof, and a spring locking member in the form of a split ring looped over at one end to provide a biting tooth adapted to be received in the annular groove to have the biting tooth project beyond the face of the nut to engage with the teeth of the washer.

3. A nut lock comprising in combination with a bolt having a flat side on the threaded end thereof, a washer mounted on the end of the bolt to be held against turning movement by engagement with the flat side of the bolt provided with radially extending teeth formed on one face thereof, a nut having an interrupted annular groove formed in the engaging face to follow the line of the central orifice thereof, a spring locking member in the form of a split ring looped over at one end to provide a biting tooth adapted to be received in the annular groove to have the biting tooth project beyond the face of the nut to engage with the teeth of the washer, and said spring locking member provided with a bent up portion in the body to give greater resiliency to the action of the biting tooth.

In testimony whereof I affix my signature in presence of two witnesses.

CHARLES E. SHORT.

Witnesses:
  G. B. Motz,
  R. Hess.

Copies of this patent may be obtained for five cents each, by addressing the "Commissioner of Patents, Washington, D. C."